March 5, 1957 A. LEENS 2,783,519
MULTIPLE COMBINATION DISPLAY INSTALLATION
Filed Dec. 18, 1953 2 Sheets-Sheet 1
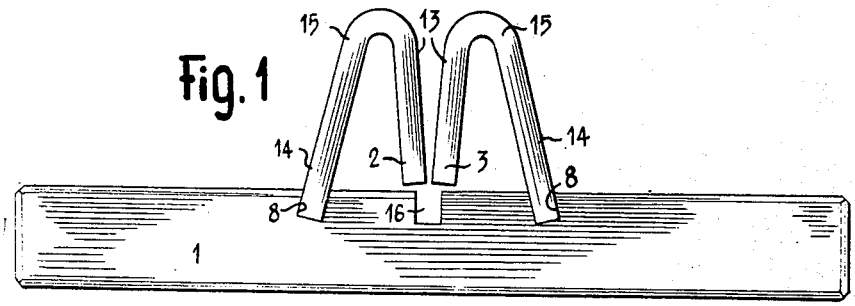
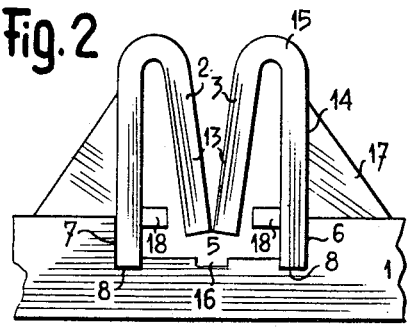
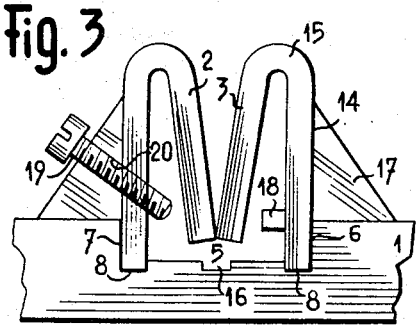
INVENTOR
ANDRÉ LEENS March 5, 1957  A. LEENS  2,783,519
MULTIPLE COMBINATION DISPLAY INSTALLATION
Filed Dec. 18, 1953  2 Sheets-Sheet 2
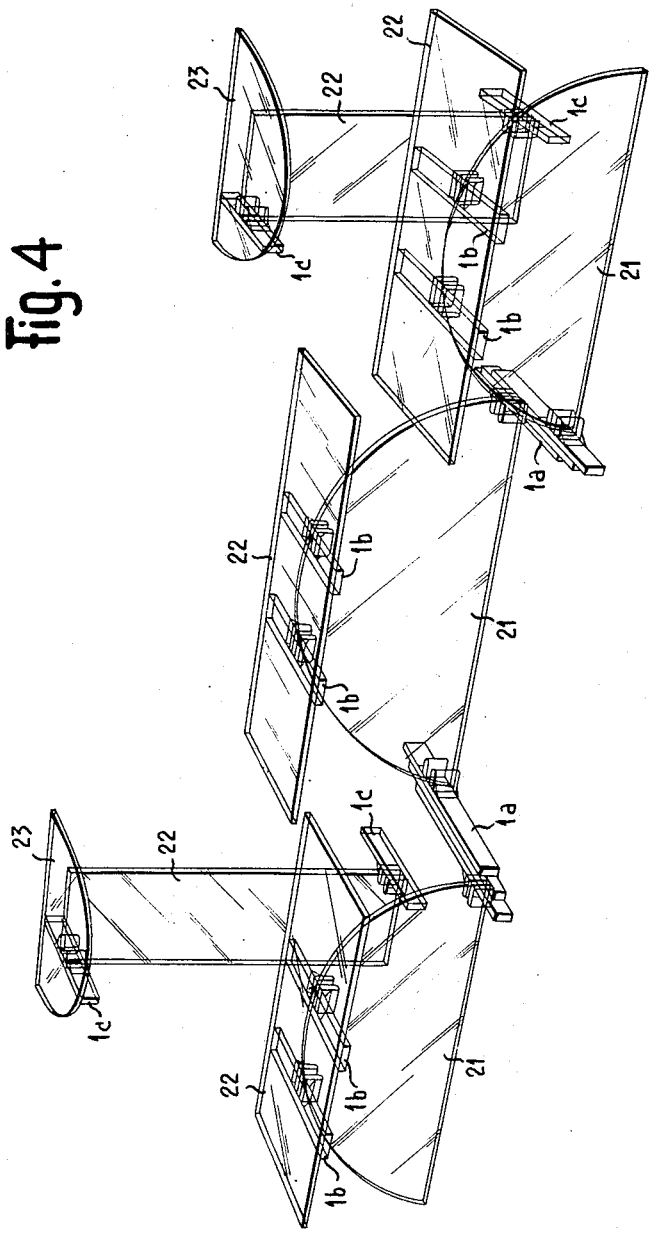
INVENTOR
ANDRÉ LEENS
By 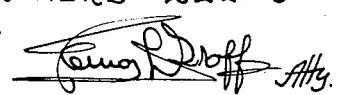 Atty.

United States Patent Office 2,783,519
Patented Mar. 5, 1957

2,783,519

MULTIPLE COMBINATION DISPLAY INSTALLATION

André Leens, Lausanne, Switzerland

Application December 18, 1953, Serial No. 399,140

Claims priority, application Switzerland December 19, 1952

6 Claims. (Cl. 24—255)

The present invention has for its subject an installation of multiple combinations, especially for purposes of exhibition of goods, of the type comprising at least a support having means for enabling it to assemble at least one element in the form of a plate.

This installation is characterized in that the said support comprises a body of general prismatic shape, provided on at least one of its faces with at least a group of clamping members forming a pair of jaws resiliently deformable for holding the plate engaged between them.

Various elements constituting the said installation are shown diagrammatically and by way of example in the accompanying drawings, wherein:

Fig. 1 shows a simple support provided with a single group of clamping members.

Fig. 2 is a partial view similar to Fig. 1, of a second form of construction.

Fig. 3 is a modification of the form of construction shown in Fig. 2.

Fig. 4 shows diagrammatically a mounting for exhibition of goods with an installation according to the invention.

The installation shown in the drawing comprises a number of elements adapted to be assembled so as to form various exhibition arrangements. All these elements are formed in such a manner as to be capable of being coupled in a removable manner one with one another so as to thus allow multiple exhibition arrangements differing one from the other.

Amongst the various elements composing the installation, this latter arrangement comprises supports having means enabling them to be assembled on one or more elements in the form of a plate for holding them in different positions. Similar to other known installations, the plate elements of the said apparatus are preferably formed by glass plates of any shape.

Fig. 1 shows a form of construction of a simple support provided with a single group of clamping members. Said support comprises a body 1 of general prismatic shape, to one face of which is secured a group of clamping members for a pair of jaws 2 and 3 adapted to come into engagement with a plate, for example of glass, forming part of the assembly.

In this form of construction the members 2 and 3 are each formed by a blade 15 of resilient material folded into the general shape of a V. The limb 14 of the V is longer than that forming the jaws 2, 3, respectively, and engages with a notch 8 provided in the body 1.

As shown in Fig. 1, the notches 8 into which the blades 15 are fitted, are cut into the body 1 in such a manner that the two limbs 14 of the two blades form an angle between them. The limbs 14 are simply glued to the interior of the notches 8.

The free limbs 13 of the two blades forming a group of clamping members are adjacent one another and form the active part of the jaws 2 and 3 adapted to clamp a plate.

The body 1 is also provided, on its face carrying the said jaws 2 and 3, with a transverse notch 16 located opposite the free end of the two blades 15. The notch 16 is adapted to receive the edge of the plate held by the two jaws 2 and 3.

It will be understood that supports may be provided formed by a body 1 having a number of groups of clamping members and these may be located on different faces of the body, for example on two opposite faces.

The element shown partly in Fig. 2, comprises two jaws 2 and 3 formed by blades 15 of resilient material and of general U or V shape so as to form tongues 13 each carried by a rigid part 14 projecting from one of the faces of the prismatic body 1 of the base. One of the limbs of the U is fitted into a groove 8 of the body 1, located in the bottom of a recess 5. The lower ends of parts 14 of the limbs are secured to the walls 6 and 7 of the recess and this limb is rendered rigid by a corner piece 17 glued to the body 1 and to the part 14 of the blade. In the bottom of the recess 5 is provided a groove 16 located at the middle of said recess, opposite the jaws 2 and 3. Said groove is adapted to serve as a seating for the edge of the plate introduced between jaws for the purpose of retaining it in position.

Stops 18 are provided for limiting the amplitude of the resilient deformations of the tongues 13. As shown in the drawing the free ends of the tongues 13 normally contact one another resiliently.

In the modification shown in Fig. 3, one of the stops 18 is formed by a screw 19 screwed into a threaded bore 20 provided in one of the members 17 and which also passes through the corresponding limb 14. The adjustable stop formed by the screw 19 forms both a clamping element for the plate engaged between the jaws 2 and 3 and adds a supplementary mechanical clamping action to the resilient clamping effect of the jaws.

Fig. 4 shows the installation used for forming a set of shelves. As shown in the drawing the set of shelves is mounted by means of two supports 1a provided with two groups of jaws. In fact, each retains by one of its angles two vertical glass plates 21 in the form of a semicircle, on each portion of the upper part of which is secured a pair of supports 1b to a single group of jaws. On the upper part of the support is placed a horizontal rectangular glass plate 22 forming a radius.

Three identical assemblies 21, 22 are arranged with a lateral spacing along an extension of one another. Behind each of the assemblies 21, 22 at the ends is located staging formed by a support 1c with a group of jaws arranged in staggered relation and holding a rectangular glass plate 22 at one of its narrow sides by an angle-piece. On one of the upper corners of said glass plate 22 is placed a second support 1c which forms, together with the edge of plate 22, a support for a glass plate 23 of semi-circular shape arranged horizontally.

It will be understood that numerous combinations may be obtained by means of an installation comprising various supports and plates of various shapes.

Preferably, all of the supports, assembling elements, and plates used for forming the vertical walls or shelves are made of a transparent thermo-plastic material, although it is understood that they may be constructed of other material if desired.

I claim:

1. A multiple combination display installation member for showcase display of goods, comprising, in combination, a generally prismatically shaped body having on at least one of its faces a first notch, a second notch, and a third notch, each being spaced from the other, at least one clamping member including two inverted V-shaped blades of resilient material, one leg of one of said inverted V-shaped blades being fixedly positioned in said first notch, one leg of said other inverted V-shaped blade being fixedly positioned in said third notch, said respective other legs of said inverted V-shaped blades being freely positioned adjacent each other opposite said second notch, whereby said other freely positioned legs act as clamping jaw members, and whereby a display shelf may be positioned both between said clamping jaw member and in said second notch.

2. A multiple combination display installation member for showcase display of goods, comprising, in combination, a generally prismatically shaped body having on at least one of its faces a first notch, a second notch, and a third notch, each being parallel to and spaced from the other and transversely placed with respect to the longest edge of said face, at least one clamping member including two inverted V-shaped blades of resilient material, one leg of one of said inverted V-shaped blades being fixedly positioned in said first notch, one leg of said other inverted V-shaped blade being fixedly positioned in said third notch, said respective other legs of said inverted V-shaped blades being freely positioned adjacent each other opposite said second notch, whereby said other freely positioned legs act as clamping jaw members, and whereby display shelf may be positioned both between said clamping jaw members and in said second notch.

3. A multiple combination display installation member for showcase display of goods, comprising, in combination, a generally prismatically shaped body having on at least one of its faces a recess, said recess having on its bottom face a first notch, a second notch, and a third notch, each being parallel to and spaced from the other and transversely placed with respect to the longest edge of said support face, said first notch and said third notch being adjacent to the respective side walls of said recess, at least one clamping member including two inverted V-shaped blades of resilient material, one leg of one of said inverted V-shaped blades being fixedly positioned in said first notch, one leg of said other inverted V-shaped blade being fixedly positioned in said third notch, said respective other legs of said inverted V-shaped blades being freely positioned adjacent each other opposite said second notch, whereby said sidewalls of said recess constitutes lateral exterior seatings for said fixedly positioned legs, and whereby said other freely positioned legs act as clamping jaw members, and whereby a display shelf may be positioned both between said clamping jaw members and in second notch.

4. The multiple combination display installation member of claim 3 including stop means for limiting the deformation of said freely positioned legs, said stop means being operatively connected to said generally prismatically shaped body at its face at points adjacent the edges of said recess.

5. The multiple combination display installation member of claim 3 including stop means for limiting the deformation of said freely positioned legs, said stop means comprising one screw member positioned through said fixedly positioned leg and having its end portion adjacent the respective freely positioned leg, whereby said screw member adds a mechanical locking effect to the resilient locking effect of the said jaws.

6. The multiple combination display installation member of claim 3 including stop means for limiting the deformation of said freely positioned legs, said stop means being operatively connected to said generally prismatically shaped body at its face at points adjacent the edges of said recess, and means for rendering each of said fixedly positioned legs rigid, said means being attached to said body at its face at points adjacent said fixedly positioned legs.

References Cited in the file of this patent

UNITED STATES PATENTS

| | | |
|---|---|---|
| 319,742 | Nevegold | June 9, 1885 |
| 820,438 | Plym | May 15, 1906 |
| 1,148,292 | Davey | July 27, 1915 |
| 1,734,407 | Taussig | Nov. 5, 1929 |
| 1,767,823 | Vanderveld | June 24, 1930 |
| 1,876,423 | Kennedy | Sept. 6, 1932 |
| 1,927,635 | Garfunkel | Sept. 19, 1933 |
| 1,987,826 | Heumann | Jan. 15, 1935 |
| 2,483,769 | Hickey | Oct. 4, 1949 |
| 2,554,559 | Chadwell | May 29, 1951 |